United States Patent
Wrolson et al.

(10) Patent No.: US 6,627,698 B2
(45) Date of Patent: Sep. 30, 2003

(54) METHOD OF MAKING SILICONE EMULSIONS HAVING LOW RESIDUAL VOLATILE SILOXANE OLIGOMER CONTENT

(75) Inventors: Burt Michael Wrolson, Midland, MI (US); Brett Lee Zimmerman, Birch Run, MI (US)

(73) Assignee: Dow Corning Corporation, Midland, MI (US)

( * ) Notice: Subject to any disclaimer, the term of this patent is extended or adjusted under 35 U.S.C. 154(b) by 151 days.

(21) Appl. No.: 09/782,667

(22) Filed: Feb. 13, 2001

(65) Prior Publication Data

US 2003/0059393 A1 Mar. 27, 2003

(51) Int. Cl.$^7$ ............................................. C08L 83/00
(52) U.S. Cl. ......................... 524/837; 528/10; 528/12; 528/34; 524/588; 424/407; 424/70.1; 424/78.02
(58) Field of Search ................. 524/837, 265, 524/588; 424/400, 401, 78.02, 70.1; 528/10, 12, 34; 516/55

(56) References Cited

U.S. PATENT DOCUMENTS

| | | | |
|---|---|---|---|
| 2,834,754 A | 5/1958 | Hatch et al. | 260/46.5 |
| 2,891,920 A | 6/1959 | Hyde et al. | 260/29.2 |
| 3,294,725 A | 12/1966 | Findlay et al. | 260/29.2 |
| 4,096,160 A | 6/1978 | Ashby | 260/448.2 E |
| 4,600,436 A | 7/1986 | Traver et al. | 106/3 |
| 4,962,165 A * | 10/1990 | Bortnick et al. | 525/479 |
| 4,999,398 A | 3/1991 | Graiver et al. | 524/837 |
| 5,021,499 A * | 6/1991 | Tochinai et al. | 524/487 |
| 5,502,105 A | 3/1996 | Revis | 524/837 |
| 5,661,215 A | 8/1997 | Gee et al. | 524/837 |
| 5,922,108 A | 7/1999 | Lehmann et al. | 95/141 |

FOREIGN PATENT DOCUMENTS

| | | | |
|---|---|---|---|
| EP | 0459500 B1 | 4/1991 | C08G/77/10 |
| EP | 0584458 | * 3/1994 | |

* cited by examiner

Primary Examiner—Michael G. Hartley
Assistant Examiner—Sharmila Gollamudi
(74) Attorney, Agent, or Firm—Jim L. DeCesare

(57) ABSTRACT

A batch steam distillation process removes volatile siloxane oligomers from an emulsion containing siloxane polymers and volatile siloxane oligomers prepared by emulsion polymerization of volatile siloxane oligomers. In one embodiment, emulsions stripped of volatile siloxane oligomers are re-catalyzed to initiate condensation polymerization. In another embodiment, clear emulsions stripped of volatile siloxane oligomers are provided even though an antifoam is used in the stripping process.

8 Claims, No Drawings

US 6,627,698 B2

METHOD OF MAKING SILICONE EMULSIONS HAVING LOW RESIDUAL VOLATILE SILOXANE OLIGOMER CONTENT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to a method of removing residual volatile siloxane oligomers from emulsions containing siloxane polymers prepared by emulsion polymerization of the volatile siloxane oligomers. In particular, volatile siloxane oligomers are removed from emulsions containing siloxane polymers by a batch steam distillation process. In one embodiment, emulsions stripped of volatile siloxane oligomers are re-catalyzed to initiate condensation polymerization. In another embodiment, clear emulsions stripped of volatile siloxane oligomers are provided even though an antifoam is used in the stripping process.

BACKGROUND OF THE INVENTION

U.S. Pat. No. 2,834,754 (May 13, 1958) describes a batch process for removing volatile organopolysiloxanes from high molecular weight organopolysiloxanes with a stripping gas such as steam, neon, nitrogen or argon, while kneading. According to that process, a Banbury mixer with sigma-type blades is used to remove octamethylcyclotetrasiloxane from a highly viscous masse or gummy elastic silicone solid. Stripping emulsions is not disclosed, however.

A continuous process employing a stripping unit containing heated parallel plates is used in U.S. Pat. No. 4,096,160 (Jun. 20, 1978) to remove a steam heated mixture of hexamethylcyclotrisiloxane, octamethylcyclotetrasiloxane, decamethylcyclopentasiloxane, and dodecamethylcyclohexasiloxane, from silanol terminated dimethylpolysiloxane fluids having a viscosity of 1,000–1,000,000 centistoke ($mm^2/s$). Stripping emulsions is not disclosed, however.

Both U.S. Pat. Nos. 2,834,754 and 4,096,160 require specialized equipment for handling viscous polymers. Also, the rate of heat transfer is substantially reduced when processing such viscous polymers.

One known method for obviating processing difficulties associated with viscous polymers is to prepare and handle such polymers in the form of an aqueous emulsion. A batch process carried out in a heated flask is described in U.S. Pat. No. 4,600,436 (Jul. 15, 1986) for stripping emulsion polymerized polysiloxane emulsions of the cyclic siloxanes or other low molecular weight siloxanes used to prepare the emulsions. According to the '436 patent, emulsions stripped by such a batch process possess improved film properties.

In another batch process described in U.S. Pat. No. 5,922,108 (Jul. 13, 1999), volatile organopolysiloxanes such as octamethylcyclotetrasiloxane are removed from a fluid stream such as air containing volatile organopolysiloxanes and a hydrocarbon such as methane or pentane, by passing the fluid stream through a column packed with dry soil. Stripping emulsions is not disclosed, however.

Unexpectedly, however, it was discovered that emulsion polymerized polysiloxane emulsions stripped of cyclic siloxanes or other low molecular weight siloxanes from which they were prepared, by the batch steam distillation process according to this invention, rather than by processes described in such patents, possess improved properties not realized by any of those patentees. The terms stripping and distillation are used herein interchangeably to describe processes according to this invention.

For example, in steam stripping emulsions to remove cyclic siloxanes, conditions were unexpectedly identified enabling preparation of clear emulsions. The ability to prepare a clear emulsion in this manner in the presence of an antifoam during the stripping process was unexpected because the clarity of such materials can be reduced significantly by a relatively low concentration of large particles, the formation of which would be expected when an antifoam is used and when operating under the harsh conditions of a steam stripping process.

It was also found that emulsions stripped of volatile siloxane oligomers could be re-catalyzed to initiate condensation polymerization, and that the viscosity or molecular weight of the polymer in stripped emulsions could be further increased without appreciably increasing the content of volatile siloxane oligomers in stripped emulsions. This enables one to prepare emulsions containing polymers of yet higher molecular weight, while at the same time producing emulsions containing lower levels of volatile cyclic oligomers, than would otherwise be present under typical emulsion polymerization conditions.

BRIEF SUMMARY OF THE INVENTION

The invention relates to a batch steam distillation process for removing volatile siloxane oligomers from an emulsion containing siloxane polymers and volatile siloxane oligomers prepared by emulsion polymerization of volatile siloxane oligomers.

According to the process, the emulsion is fed batchwise to a steam distillation device for vaporizing liquids in which the emulsion is subjected to vaporization in the steam distillation device. An overhead fraction containing volatile siloxane oligomers is removed from the steam distillation device, while an unvaporized bottom fraction remains in the steam distillation device. The unvaporized bottoms fraction can be removed at the completion of the stripping process. The unvaporized bottom fraction consists of an emulsion containing siloxane polymers which is substantially free of any residual volatile siloxane oligomers used to prepare the emulsion.

The steam extracts the volatile siloxane oligomer from the emulsion, and the extracted volatile siloxane oligomer can be recovered from the overhead fraction by known condensing and decanting processes. The operating temperature used in the steam distillation device is generally in the range of 70–110° C., preferably 80–105° C.

According to one embodiment of the invention, the method of preparing an aqueous emulsion containing a siloxane polymer involves:

(I) heating and emulsion polymerizing a mixture containing a volatile siloxane oligomer or mixture of volatile siloxane oligomers, at least one anionic surfactant or cationic surfactant, optionally a nonionic surfactant, water, and an emulsion polymerization catalyst or mixture of emulsion polymerization catalysts;

(II) neutralizing the emulsion polymerization catalyst;

(III) stripping the emulsion prepared in (I) using steam until the emulsion contains less than 0.18 parts by weight of volatile siloxane oligomer per unit weight of the siloxane polymer in the emulsion;

(IV) cooling the stripped emulsion to a temperature less than the temperature in (I);

(V) adding another catalyst to the cooled stripped emulsion of (IV) and allowing the contents of the cooled stripped emulsion to further polymerize; and (VI) neutralizing the catalyst added in (V) to provide an emulsion containing a siloxane polymer with a higher molecular weight than the molecular weight of the siloxane polymer prepared in (I) and further containing less than 0.18 parts by weight of volatile siloxane oligomer per unit weight of the siloxane polymer in the emulsion;

In this embodiment, the mixture in (I) for emulsion polymerizing is heated to a temperature in the range of 50–95° C.; the stripping temperature in (III) is in the range of 70–110° C.; the temperature in (IV) is in the range of 0–50° C. The steam in (III) can be generated in situ or fed into the emulsion from an external source. The catalyst used in (V) can be the same catalyst used in (I) or it can be a different catalyst.

According to the other embodiment of the invention, the method of preparing an aqueous emulsion containing particles of siloxane polymer of an average size less than 0.1 micron/100 nanometer involves:

(I) heating and emulsion polymerizing a mixture containing a volatile siloxane oligomer or mixture of volatile siloxane oligomers, at least one anionic surfactant or cationic surfactant, optionally a nonionic surfactant, water, and an emulsion polymerization catalyst or mixture of emulsion polymerization catalysts;

(II) neutralizing the emulsion polymerization catalyst;

(III) adding an antifoam composition to the neutralized emulsion in (II) at a concentration of 0.01–20 weight parts of active antifoam per million weight parts of the emulsion;

(IV) stripping the emulsion using steam until the emulsion contains less than 0.18 parts by weight of volatile siloxane oligomer per unit weight of the siloxane polymer in the emulsion, and the fraction of light at a wavelength of 580 nanometer transmitted though the emulsion exceeds 70 percent.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

Batch steam distillation, or stripping, is a process in which the vaporization of volatile constituents of a batch material is effected at a reduced temperature by introduction of steam directly into a liquid charge. The volatile constituents must be immiscible with steam to realize benefits of reduced operating temperatures. By means of batch steam distillation, volatile liquids may be separated from other relatively non-volatile components in the liquid charge at temperatures sufficiently low so that thermal decomposition does not occur. Steam distillation transfers lower boiling components from the liquid charge to the vapor phase. The vapors are then condensed to recover desired components. In steam distillation, steam is admitted into direct contact with the liquid charge to be evaporated, and the flow of steam to a condenser is used to transport the distillates of low volatility.

Generally, in any steam distillation process, the bubbles of steam rise through the liquid charge, and escape from the surface of the liquid charge bearing a concentration of the volatile component which is governed by the partial vapor pressure of the volatile component from the charge. To obtain higher values of vaporization efficiency, steam is introduced to the charge through a large number of small orifices, and at an appreciable depth below the surface of the liquid charge.

Equipment used for these steam distillation separation processes can range from devices as simple as laboratory scale steam generator flasks, distillation flasks with side entry steam ports, and condensers; to more complex equipment such as distillation flasks, fractionating columns with glass bead packing, distillation heads, and condensers. Columns and towers often contain various other types of packing or other types of exchange media such as bubble plates or trays of various design.

For example, in some steam distillation techniques, a batch steam still can be provided with closed steam coils to heat and maintain the charge at a desired temperature, in addition to suitably arranged perforated steam sprays to distribute live steam through the liquid charge. Vapors from the still are condensed in a suitable overhead condenser, and the condensate of water and water insoluble volatile components flows to a liquid phase separating device such as a settling tank, cyclone, centrifuge, coalescer, or separating membrane. Such batch steam stills are generally well insulated so that heat losses are minimized.

The rate at which volatile siloxane oligomers diffuse from the emulsion particles to the steam increases with temperature. As a consequence, the temperature of the liquid charge should be within the range of 70–110° C., preferably 80–105° C. Operation at sub-atmospheric pressure is required at temperatures below the normal boiling point of the emulsion being treated.

Instead of using a batch stripping process where externally generated steam is sparged into the emulsion, it may be more convenient to use a batch stripping process where steam is generated in situ by boiling the emulsion. However, in this case, care must be exercised not to remove too much water and creating a concentrated emulsion with an undesirably high viscosity. For example, fresh water could be added to replace any water lost from steam generation. However, replacing water lost from in situ steam generation with fresh water is not desirable on a commercial scale as this generates significant quantities of waste water.

Therefore, to minimize the amount of aqueous waste, the overhead fraction containing steam and extracted volatile siloxane oligomer in the vapor phase can be condensed, the two phases separated, and cooled so that the water can be returned to the steam distillation device without reintroducing colloidal portions of extracted volatile siloxane oligomer back into the steam distillation device.

The return of any extracted volatile siloxane oligomer to the steam distillation device along with condensed water is undesirable when stripping clear emulsions as the extracted volatile siloxane oligomer will tend to form large droplets in the emulsion, with the result that the clarity of the product remaining in the steam distillation device is unnecessarily diminished.

Typically, the steam distillation process is continued until the emulsion in the unvaporized fraction in the steam distillation device contains less than 0.18 parts by weight of volatile siloxane oligomer per unit weight of the siloxane polymer in the emulsion. This can be accomplished, for example, by continuing steam distillation of the unvaporized fraction in the steam distillation device until the desired content is obtained. The process can be accelerated by utilizing a higher temperature within the heated zone of the steam distillation device to effect the separation.

For most emulsions prepared according to this invention, the residence time of the emulsion in the steam distillation device will be less than 6 hours, preferably less than 5 hours, and most preferably less than 4 hours. The process is capable of functioning in a practical manner using emulsions containing a siloxane polymer with a viscosity of 100–100,000,000 centistoke (mm²/s).

As used herein, the term emulsion polymerization refers to any of the silicone emulsion polymerization processes known in the art, as represented for example by processes such as described in U.S. Pat. No. 2,891,920 (Jun. 23, 1959), U.S. Pat. No. 3,294,725 (Dec. 27, 1966), U.S. Pat. No. 4,999,398 (Mar. 12, 1991), U.S. Pat. No. 5,502,105 (Mar. 26, 1996), U.S. Pat. No. 5,661,215 (Aug. 26, 1997), and European Patent Specification EP 0 459 500 B1 (Mar. 5, 1997).

These emulsion polymerization processes are typically carried out at a temperature in the range of 25–100° C., preferably 50–95° C., and involve opening of the ring of a volatile siloxane oligomer using an acid or a base catalyst in the presence of water. Upon opening of the ring, siloxanes with terminal hydroxy groups are formed. These siloxanes then react with one another by a condensation reaction to form the siloxane polymer.

A simplified representation of the process chemistry is shown below for a volatile siloxane oligomer such as octamethylcyclotetrasiloxane, in which Me represents $CH_3$.
$(Me_2SiO)_4 + H_2O +$
Catalyst→$HOMe_2SiOMe_2SiOMe_2SiOSiMe_2OH$→$HOMe_2SiOMe_2SiOMe_2SiOSiMe_2OH +$
$HOMe_2SiOMe_2SiOMe_2SiOSiMe_2OH$→$HOMe_2SiO(Me_2SiO)_6SiMe_2OH + H_2O$.

Siloxane polymers of higher molecular weight can be obtained by allowing this process to continue.

Catalysts used in such processes include strong mineral acids such as hydrochloric acid; strong alkaline catalysts such as sodium hydroxide; quaternary ammonium hydroxides; surface active sulfonic acids such as dodecylbenzene sulfonic acid and the sodium salts thereof; silanolates; and organosilanolates. Other examples of suitable catalysts can be found in U.S. Pat. Nos. 2,891,920, 3,294,725, 4,999,398, 5,502,105, 5,661,215, and EP 0 459 500 B1.

Generally, volatile siloxane oligomers used in emulsion polymerization and removed by this steam distillation process are cyclic siloxanes of the formula

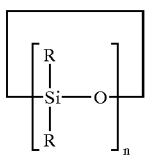

where each R is a saturated or unsaturated alkyl group of 1–6 carbon atoms, an aryl group of 6–10 carbon atoms, and n is 3–7. R can optionally contain a functional group which is unreactive in the ring opening and polymerization reaction.

Representative R groups are methyl, ethyl, propyl, phenyl, allyl, vinyl, and —R'F. R' is an alkylene group of 1–6 carbon atoms or an arylene group of 6–10 carbon atoms, and F is a functional group such as amine, diamine, halogen, carboxy, or mercapto. R can also be —R'F'R where R' and R are described above and F' is a non-carbon atom such as oxygen, nitrogen, or sulfur.

Volatile siloxane oligomers of most interest herein include octamethylcyclotetrasiloxane (D4) and decamethylcyclopentasiloxane (D5). Silicone emulsions that can be prepared according to the method of the invention include emulsions obtained by emulsion polymerization of only volatile cyclic siloxane oligomers or by emulsion polymerization of volatile cyclic siloxane oligomers in combination with alkoxysilanes. Suitable alkoxysilanes can be represented by the formulas $R"Si(OR''')_3$, $R"_2Si(OR''')_2$ or $(R'''O)_4Si$ wherein $R"$ is either a neutral organic group such as an unsubstituted alkyl group $C_aH_{2a+1}$ containing 1–12 carbon atoms or an aryl group such as phenyl, or a cationic organofunctional group such as an amino group. $R'''$ in hydrolyzable group $(OR''')$ in these formulas represents an alkyl group containing 1–6 carbon atoms. Silicone emulsions prepared with such alkoxysilanes generally contain 1–10 mole percent of $R"$ groups based on the total content of silicones in the emulsion.

The tetraalkoxysilanes $(R'''O)_4Si$ are exemplified by tetramethoxysilane, tetraethoxysilane, tetrapropoxysilane, and tetrabutoxysilane.

Hydrolyzable water-soluble or partially pre-hydrolyzed alkoxysilanes $R"Si(OR''')_3$ with neutral organic groups $R"$ are exemplified by methyltrimethoxysilane (MTM), methyltriethoxysilane, ethyltrimethoxysilane, propyltrimethoxysilane, n-butyltrimethoxysilane, hexyltrimethoxysilane, octyltrimethoxysilane, octyltriethoxysilane, dodecyltrimethoxysilane, dodecyltriethoxysilane, and phenyltrimethoxysilane.

Hydrolyzable or partially pre-hydrolyzed water-soluble alkoxysilanes $R"Si(OR''')_3$ with cationic organofunctional groups $R"$ are exemplified by N-(2-aminoethyl)-3-aminopropyltrimethoxysilane, 3-aminopropyltrimethoxysilane, 3-aminopropylmethyldiethoxysilane, and n-cyclohexylaminopropyl methyldimethoxysilane.

Silicone emulsions that can be prepared according to the method of the invention can contain anionic surfactants, including but not limited to, sulfonic acids and their salt derivatives. Some representative examples of anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isethionate; amides of amino sulfonic acids such as the sodium salt of oleyl methyl tauride; sulfonated products of fatty acid nitrites such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms such as sodium lauryl ether sulfate; and alkylaryl sulfonates having one or more alkyl groups of eight or more carbon atoms such as neutral salts of hexadecylbenzene sulfonic acid and $C_{20}$ alkylbenzene sulfonic acid.

Commercial anionic surfactants which can be useful in this invention include the sodium salt of dodecylbenzene sulfonic acid sold under the name SIPONATE DS-10 by Alcolac Inc., Baltimore, Md.; sodium n-hexadecyl diphenyloxide disulfonate sold under the name DOWFAX 8390 by The Dow Chemical Company, Midland, Mich.; and the sodium salt of a secondary alkane sulfonate sold under the name HOSTAPUR SAS 60 by Clariant Corporation, Charlotte, N.C.

Silicone emulsions prepared according to the method of the invention can contain cationic surfactants, including compounds containing quaternary ammonium hydrophilic moieties in the molecule which are positively charged, such as quaternary ammonium salts represented by $R3R4R5R6N^+X^-$ where R3 to R6 are alkyl groups containing 1–30 carbon atoms, or alkyl groups derived from tallow, coconut oil, or soy; and X is halogen, i.e., chlorine or bromine. Dialkyl dimethyl ammonium salts which can be used are represented by $R7R8N^+(CH_3)_2X^-$ where R7 and R8 are alkyl groups containing 12–30 carbon atoms or alkyl groups derived from tallow, coconut oil, or soy; and X is halogen. Monoalkyl trimethyl ammonium salts which can be used are represented by $R9N^+(CH_3)_3X^-$ where R9 is an alkyl group containing 12–30 carbon atoms or an alkyl group derived from tallow, coconut oil, or soy; and X is halogen.

Representative quaternary ammonium salts are dodecyltrimethyl ammonium chloride/lauryltrimethyl ammonium chloride (LTAC), cetyltrimethyl ammonium chloride (CTAC), didodecyldimethyl ammonium bromide, dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium chloride, and ditallowdimethyl ammonium bromide. These and other quaternary ammonium salts are commercially available under names such as ADOGEN, ARQUAD, TOMAH, and VARIQUAT.

Silicone emulsions that can be prepared according to the method of the invention can contain nonionic surfactants. Commercial types of nonionic surfactants can be exemplified by 2,6,8-trimethyl-4-nonyloxy polyethylene oxyethanols (6EO) and (10EO) sold under the names TERGITOL® TMN-6 and TERGITOL® TMN-10; alkyleneoxy polyethylene oxyethanol ($C_{11-15}$ secondary alcohol ethoxylates 7EO, 9EO, and 15EO) sold under the names TERGITOL® 15-S-7, TERGITOL® 15-S-9, TERGITOL® 15-S-15; other $C_{11-15}$ secondary alcohol ethoxylates sold under the names TERGITOL® 15-S-12, 15-S-20, 15-S-30, 15-S-40; and octylphenoxy polyethoxy (40EO) ethanol sold under the name TRITON® X-405. All of these surfactants are sold by Union Carbide Corporation, Danbury, Conn.

Other types of commercial nonionic surfactants are nonylphenoxy polyethoxy ethanol (10EO) sold under the name MAKON 10 by Stepan Company, Northfield, Ill.; polyoxyethylene 23 lauryl ether (Laureth-23) sold commercially under the name BRIJ 35L by ICI Surfactants, Wilmington, Del.; and RENEX 30, a polyoxyethylene ether alcohol sold by ICI Surfactants, Wilmington, Del. The presence of a nonionic surfactant is optional, however, when one is present, it is present in combination with an anionic or cationic surfactant.

Most typically, emulsions prepared according to this invention contain a siloxane polymer concentration of about 10 to 70 percent by weight of the total emulsion, preferably about 25 to 60 percent by weight. While emulsions containing less than about 10 percent siloxane polymer content can be made, such emulsions hold little or no economic value. The surfactant is generally present at about 0.05 to 30 percent by weight of the total emulsion, preferably about 0.1 to 20 percent by weight. Water and salts constitute the balance of the emulsion to 100 percent.

Silicone emulsions that can be prepared according to the method of the invention contain a salt that is a product of the neutralization reaction used to deactivate the catalyst used in the emulsion polymerization reaction. The salt can be a simple compound such as sodium acetate formed by neutralization of sodium hydroxide with acetic acid after emulsion polymerization with a cationic surfactant. This is described in U.S. Pat. No. 5,661,215. The salt can be a more complex compound such as triethanolamine dodecylbenzene sulfonate formed by neutralization of dodecylbenzene sulfonic acid with triethanolamine, as also described in U.S. Pat. No. 5,661,215.

The addition of a preservative after the stripping process may be desirable since emulsions are susceptible to microbiological contamination. Some representative preservatives include compositions such as formaldehyde; 1,3-dimethylol-5,5-dimethyl hydantoin, i.e., DMDM HYDANTOIN; 5-bromo-5-nitro-1,3-dioxane; methyl or propyl paraben; sorbic acid; imidazolidinyl urea; and KATHON CG (5-chloro-2-methyl-4-isothiazolin-3-one).

Two chemical reactions are believed to occur during the stripping operation under slightly basic or acidic conditions, as shown below.

Reaction 1

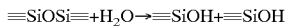

Reaction 2

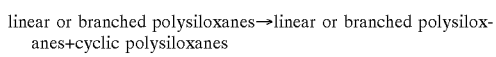

The polysiloxane viscosity or molecular weight generally decreased over the course of the batch stripping operation at a slightly acidic pH as taught by U.S. Pat. No. 4,600,436, without an appreciable increase in the overall concentration of volatile siloxane oligomers.

Therefore, Reaction 1, the depolymerization reaction, proceeded much faster than Reaction 2. It is believed that the high interfacial area between the silicone phase and the water phase contributes to the relatively high rate of Reaction 1. Therefore, to minimize the concentration of volatile siloxane oligomers in the finished emulsion while maximizing the viscosity of the polymer, it is desirable to minimize the amount of time required to effect the stripping operation, and to maintain the emulsion pH as close to 7 as possible.

EXAMPLES

The following examples are set forth in order to illustrate this invention in more detail.

Example 1
Kinetically Controlled Process of Making Microemulsion 129.5 g of deionized water, 3.5 g of polyoxyethylene (23) lauryl ether, a nonionic surfactant sold under the name BRIJ 35L by ICI Surfactants, Wilmington, Del., and 29.7 g of dodecylbenzene sulfonic acid, an anionic surfactant sold under the name BIOSOFT S-100 by the Stepan Company, Northfield, Ill., were added to a one liter, three neck, round bottom flask, fitted with a glass stirring rod, a TEFLON® paddle, a temperature probe, a condenser, and a feed line attached to a peristaltic pump. The agitator was set to rotate at a speed of 250 rpm, and the temperature was set to 70° C. using a temperature controller and a heating mantle. Once the temperature had stabilized at 70° C., 78.9 g. of octamethylcyclotetrasiloxane (D4), the volatile siloxane oligomer, were added to the flask over a period of one hour using the peristaltic pump. The emulsion polymerization reaction was allowed to proceed for one hour after the feed of volatile siloxane oligomer had been completed. 17.7 g of an 85 percent solution of triethanolamine in water were added to the flask to neutralize the reaction. This was followed by the addition of 40.7 g of dilution water to the flask.

An overheads liquid trap was added to the apparatus. The heating mantle was connected to a 120 volt 10 ampere variable power supply. The upper portion of the flask and the vapor line of the liquid trap were wrapped with insulation. The variable power supply was adjusted to a setting that provided for generated steam in situ at a constant rate of about 2.7 gram per minute. The contents of the flask were stripped at a temperature which was maintained at about 101° C. throughout batch stripping of the emulsion. 20 weight parts per million weight parts of emulsion of a commercial grade antifoam composition were added to the flask, to control foaming due to the in situ generation of steam. The stripping process was allowed to continue for 4.5 hours, and about 13.4 ml of volatile siloxane oligomer were removed from the steam distillation device. Periodically, water which had collected in the liquid trap was discarded, and an equal amount of fresh deionized water was added to the emulsion in the flask.

As can be seen in Table 1, the siloxane polymer viscosity in the emulsion at this stage in the process was about 2,200 centistoke ($mm^2/s$). The emulsion was cooled to 22° C., and then 4.5 g of a solution containing 37 percent hydrochloric acid in water were added to the contents of the flask to catalyze the suspension polymerization reaction. The temperature of the ensuing suspension polymerization reaction varied between 22–30° C. Some representative samples were withdrawn, neutralized to a pH of 7 using triethanolamine, and analyzed to determine the polymer viscosity and the content of volatile siloxane oligomer. These results are shown in Table 1.

The polymer viscosity was measured using a Brookfield DV-II Viscometer equipped with a CP-52 spindle. The spindle speeds are shown in Table 1. The percent of octamethylcyclotetrasiloxane (D4) in the emulsion was determined by gas chromatography. The particle size of the siloxane polymer in the resulting microemulsion was measured using a Microtrac® Ultrafine Particle Size Analyzer. The volume-weighted mean particle size of the siloxane polymer was 0.050 micron/50 nanometer.

TABLE 1

| Elapsed Time After Addition of HCl | Polymer Viscosity/Spindle Speed | Percent D4 in Emulsion |
|---|---|---|
| 0 | 2,200 cs/20 rpm | 0.12 |
| 2 hours | 20,200 cs/2.5 rpm | 0.29 |
| 6 hours | 26,500 cs/2.5 rpm | 0.53 |

As shown in Table 1, the method according to the present invention provides a viable technique for increasing the siloxane polymer viscosity, i.e., molecular weight, while at the same time maintaining in the emulsion a low level of volatile siloxane oligomer. A low level of volatile siloxane oligomer is considered anything less than about 0.5 percent by weight. This technique is not disclosed in the prior art, in particular U.S. Pat. No. 4,600,436, and represents a significant improvement over the technique which is described in the '436 patent.

The improvement is that the method according to the present invention is significantly more efficient than current methods known in the art. As described in U.S. Pat. No. 5,661,215, the molecular weight of siloxane polymers made by emulsion polymerization can be increased after the particle formation stage by decreasing the reaction temperature. However, if it is desired to remove residual volatile siloxane oligomers from an emulsion of siloxane polymer made in this manner, it is necessary to heat the emulsion again to a temperature high enough to effect the separation process, i.e., at least 70° C. The method taught in this invention avoids this additional thermal cycle.

Example 2

This example is similar to Example 1 except that a higher concentration of acid was used in the suspension polymerization step. Measurement methods used in this example are as described in Example 1.

738.0 gram deionized water, 19.8 gram of polyoxyethylene (23) lauryl ether, and 169.2 gram of dodecylbenzene sulfonic acid were added to a two liter, four neck, cylindrical flask, fitted with a temperature probe, a condenser, a feed line attached to a peristaltic pump, and a glass agitator shaft. The glass agitator shaft was equipped with a pair of four bladed impellers. The agitator was set to rotate at a speed of 465 rpm, and the temperature was set to 70° C. using a temperature controller and heating mantle. Once the temperature had stabilized at 70° C., 450.0 gram of octamethylcyclotetrasiloxane (D4) were added to the flask over a period of one hour using the peristaltic pump. The emulsion polymerization reaction was allowed to proceed for 5.5 hours after the feed of the volatile siloxane oligomer had been completed. 101.2 gram of an 85 percent solution of triethanolamine in water were added to the flask to neutralize the emulsion. The batch was mixed for fifteen minutes, followed by addition of 88.2 gram of polyoxyethylene (23) lauryl ether, 231.8 gram of deionized water, and 1.8 gram of Kathon CG. The pH of the emulsion was about 6.8, and the volume weighted mean particle size was about 0.030 micron/30 nanometer. The concentration of octamethylcyclotetrasiloxane in the emulsion was about 1.5 percent. 600 gram of this emulsion were stripped in the equipment by the method described in Example 1, except that (i) the steam rate was about 2.4 gram per minute, (ii) the concentration of the antifoam was one part per million, and (iii) the stripping process was allowed to continue for six hours. About 8 ml of volatile siloxane oligomer were removed from the steam distillation device.

250 gram of the cooled, stripped emulsion were added to a 500 ml, three neck, round bottom flask, fitted with a glass stirring rod, a TEFLON® paddle, a temperature probe, and a condenser. The agitator was set to rotate at a speed of about 200 rpm. 7.2 gram of 37 percent hydrochloric acid in water were added to the emulsion to catalyze the suspension polymerization reaction. The polymerization reaction was conducted for six hours at a temperature of about 22° C. Samples were periodically withdrawn, neutralized to a pH of about 7 with triethanolamine, and analyzed to determine the polymer viscosity and content of volatile siloxane oligomer. These results are shown in Table 2.

TABLE 2

| Elapsed Time After Addition of HCl | Polymer Viscosity & Spindle Speed | Percent D4 in the Emulsion |
|---|---|---|
| 0.0 hours | 5,000 cs – 15 rpm | 0.33 |
| 0.5 hours | 24,000 cs – 7 rpm | 0.29 |
| 2.0 hours | 57,000 cs – 7 rpm | 0.38 |
| 4.0 hours | 56,000 cs – 7 rpm | 0.47 |
| 6.0 hours | 52,000 cs – 7 rpm | 0.60 |

As can be seen, this example shows how one can increase the siloxane polymer viscosity while maintaining a low concentration of D4 in the emulsion. The concentration of siloxane polymer in the neutralized emulsions in Table 2 was about 20 percent. Therefore, the concentration of D4 in the six hour sample, based on the polymer content, was about 0.03 parts by weight of D4 per unit weight of the siloxane polymer.

Example 3

An antifoam/microemulsion mixture was prepared by adding 0.008 g of a commercial grade antifoam to 100 g of an anionic silicone oil-in-water microemulsion prepared according to the emulsion polymerization process described in European Patent Specification EP 0 459 500 B1 (Mar. 5, 1997), using dodecylbenzene sulfonic acid as anionic surfactant. The anionic silicone oil-in-water microemulsion used in this example contained a siloxane polymer with a particle size of about 0.30 micron/30 nanometer. The concentration of volatile siloxane oligomer, i.e., octamethylcyclotetrasiloxane, in the unstripped anionic silicone oil-in-water microemulsion was determined by gas chromatography to be about 1.6 percent by weight. The anionic silicone oil-in-water microemulsion had a pH of about 7, and the viscosity of the siloxane polymer was about 50,000 centistokes ($mm^2/s$).

24 g of this antifoam/microemulsion mixture and 276 g of the microemulsion without an antifoam were added to a one liter three neck, round bottom flask, fitted with a glass stirring rod, a Teflon® paddle, a temperature probe, and an overheads liquid trap and a condenser. The upper portions of the flask and the vapor line of the liquid trap were wrapped with insulation. The heating mantle was connected to a 120 volt 10-ampere variable power supply. The variable power supply was adjusted to a setting that generated steam in situ at a constant rate of about 2.3 gram per minute. The microemulsion was stripped at 103° C. for 3.5 hours. About 5.5 mL of volatile siloxane oligomer was removed. Water was drained from the trap at regular intervals, at which point, an equal amount of fresh deionized water was added to the flask.

At the end of the stripping procedure, the concentration of volatile siloxane oligomer in the microemulsion was determined to be 0.08 percent. The clarity of the microemulsion before and after the stripping procedure was determined using a SHIMADZU Model UV-2401PC Ultraviolet-Visible Spectrophotometer at a wavelength of 580 nanometer and equipped with a 10 mm diameter polyacrylate cuvette. Prior to the stripping procedure 82.1 percent of the light was transmitted through the microemulsion. After stripping the microemulsion according to this example, 81.6 percent of the light was transmitted through the microemulsion.

Example 4—Comparative

This comparative example is a replication of Example 11 of U.S. Pat. No. 4,600,436, in which "Cationic Aminofunctional Emulsion #3" prepared according to Example 1 of U.S. Pat. No. 4,600,436, was used in the stripping process according to that invention. The purpose of this comparative example is to show that processes such as the one set forth in U.S. Pat. No. 4,600,436 do not provide clear emulsion products, in contrast to processes according to the present invention, which do provide clear emulsion products.

1000 parts by weight of octamethylcyclotetrasiloxane, 23 parts by weight of isopropyl alcohol, 30 parts by weight of dimethyl soya ammonium chloride, a cationic surfactant sold under the name ARQUAD 2S 75 by Akzo Chemicals Inc., Chicago, Ill., 4 parts by weight potassium hydroxide, and 673 parts by weight of water, were loaded into a one liter, three neck, round bottom flask, fitted with a glass stirring rod, a Teflon® paddle, a temperature probe, a condenser, and a stopper. The agitator was set to rotate at a speed of 300 rpm. Once uniform, 30 parts by weight of octylphenoxy polyoxyethylene (40EO) glycol, a nonionic surfactant sold under the name TRITON® X 405 by Union Carbide Corporation, 30 parts by weight of methyl polyoxyethylene (15) cocoammonium chloride, a cationic surfactant sold under the name ETHOQUAD C/25 by Akzo Chemicals, Inc., and 300 parts by weight of deionized water, were added. The emulsion polymerization reaction was allowed to proceed for three hours, at which time a mixture of 100 parts by weight of 3(2-aminoethyl)aminopropyl trimethoxysilane, and 10 parts by weight of TRITON® X 405 nonionic surfactant, were added to the emulsion. The reaction was allowed to proceed for an additional two hours. Acetic acid was added in sufficient proportion to achieve a pH of 7. The emulsion at this stage of the process was opaque.

300 gram of the cooled emulsion were added to a one liter, three neck, round bottom flask, fitted with a glass stirring rod, a Teflon® paddle, a temperature probe, a condenser, and an overhead liquid trap. The agitator was set to rotate at a speed of 300 rpm. A heating mantle was connected to a 120 volt, 10 ampere variable power supply. The variable power supply was adjusted to a setting that generated steam in situ at a constant rate of about 3.4 gram per minute. The emulsion was stripped at 106° C. for about one hour. Water was drained from the trap at regular intervals, at which point, an equal amount of fresh deionized water was added to the flask. About 10 mL of volatile siloxane oligomer was removed. The resulting emulsion was white, opaque, and moderately viscous, showing that stripping processes generally according to the teaching of U.S. Pat. No. 4,600,436, do not provide a clear emulsion.

Example 5—Comparative

Low Temperature Stripping

An antifoam/microemulsion mixture was prepared by adding 0.05 g of a commercial grade antifoam to 300 g of the anionic silicone oil-in-water microemulsion used in Example 3. The antifoam/microemulsion mixture was added to a one liter three neck, round bottom flask, fitted with a glass stirring rod, a Teflon® paddle, a temperature probe, an overheads liquid trap, a condenser, and a vacuum pump. The upper portions of the flask and the vapor line of the liquid trap were wrapped with insulation. The heating mantle was connected to a temperature controller and the setpoint was adjusted to provide a temperature of 60° C. The vacuum pump was activated and the pressure was adjusted to about 110 mm Hg. Under these conditions, the microemulsion boiled at about 57° C. The flow rate of in situ generated steam was estimated at about 2.5 gram per minute. However, no volatile siloxane oligomer was recovered in the overheads liquid trap after stripping the microemulsion for 40 minutes. This shows the importance of conducting a stripping procedure at temperatures exceeding about 70° C.

A benefit of this invention is that it is often desirable to prepare silicone emulsions that do not contain, or that contain only very low levels of volatile siloxane oligomers, because of certain environmental, health, and safety requirements, now mandated in many domestic and foreign jurisdictions.

The removal of volatile siloxane oligomers from emulsions is also a benefit to the extent that their removal and reuse prevents the loss of an otherwise valuable commodity, i.e., the volatile siloxane oligomer, in many applications where only the siloxane polymer has any real value in the application.

Finally, removal of the volatile siloxane oligomer from emulsions used in textile mills, paper printing facilities, and other manufacturing operations, is a benefit since it obviates the potential conversion of volatile siloxane oligomers to silica dust in pollution control equipment that operates at high temperature. Silica dust is known to foul certain pollution control equipment, thereby reducing the operating efficiency and increasing the maintenance costs of such equipment.

Emulsions prepared according to this invention are useful in paper coating, textile coating, and home care applications for delivering silicone polymers to various surfaces and substrates. They can also be used to deliver silicone polymers of tailored Theological properties to the human body, i.e., as in shampoo bases to provide styling and conditioning benefits to hair, or as a delivery mechanism for use in the care of skin.

Compositions found to be most useful according to this invention generally comprise emulsions and microemulsions containing the siloxane polymer having an average particle diameter of less than about 1 micron/1,000 nanometer, and less than about 0.14 micron/140 nanometer, respectively.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of preparing an aqueous emulsion containing a siloxane polymer comprising:
   (I) heating and emulsion polymerizing a mixture containing a volatile siloxane oligomer or mixture of volatile siloxane oligomers, at least one anionic surfactant or cationic surfactant, optionally a nonionic surfactant, water, and an emulsion polymerization catalyst or mixture of emulsion polymerization catalysts, the volatile siloxane oligomer being a cyclic siloxane of the formula

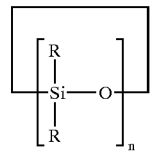

wherein each R represents a saturated or unsaturated alkyl group of 1–6 carbon atoms; an aryl group of 6–10 carbon atoms; the group —R'F where R' is an alkylene group of 1–6 carbon atoms or an arylene group of 6–10 carbon atoms, and F is an amine, diamine, halogen, carboxy, or mercapto group; or the group —R'F'R where R' and R are the same as described above and F' represents oxygen, nitrogen, or sulfur; and n is 3–7;

(II) neutralizing the emulsion polymerization catalyst;
   (III) stripping the emulsion prepared in (I) using steam distillation until the emulsion contains less than 0.18 parts by weight of volatile siloxane oligomer per unit weight of the siloxane polymer in the emulsion;
   (IV) cooling the stripped emulsion to a temperature less than the temperature in (I);
   (V) adding another catalyst to the cooled stripped emulsion of (IV) and allowing the contents of the cooled stripped emulsion to further polymerize; and
   (VI) neutralizing the catalyst added in (V) to provide an emulsion containing a siloxane polymer with a higher molecular weight than the molecular weight of the siloxane polymer prepared in (I), and containing less than 0.18 parts by weight of volatile siloxane oligomer per unit weight of the siloxane polymer in the emulsion.

2. A method according to claim 1 where the mixture in (I) for emulsion polymerizing is heated to a temperature in the range of 50–95° C.

3. A method according to claim 1 where the stripping temperature in (III) is in the range of 70–110° C.

4. A method according to claim 1 where the temperature in (IV) is in the range of 0–50° C.

5. A method according to claim 1 where the steam in (III) is generated in situ.

6. A method according to claim 1 where the steam in (III) is fed into the emulsion from an external source.

7. An emulsion prepared according to the method defined in claim 1.

8. A method of treating a surface or substrate selected from the group consisting of hair, skin, paper, and textile, comprising applying to the surface or substrate the emulsion prepared according to the method defined in claim 1.

* * * * *